United States Patent [19]

Aoki

[11] Patent Number: 5,400,045

[45] Date of Patent: Mar. 21, 1995

[54] INDICATION DISPLAY UNIT FOR A VEHICLE

[75] Inventor: Kunimitsu Aoki, Shizuoka, Japan

[73] Assignee: Yazaki Corporation, Tokyo, Japan

[21] Appl. No.: 996,856

[22] Filed: Dec. 21, 1992

Related U.S. Application Data

[63] Continuation of Ser. No. 799,028, Nov. 25, 1991, abandoned, which is a continuation of Ser. No. 330,010, Mar. 29, 1989, abandoned.

[30] Foreign Application Priority Data

Apr. 1, 1988 [JP] Japan .................. 63-42937 U

[51] Int. Cl.⁶ ...................... G02B 27/10; G03B 21/00
[52] U.S. Cl. ............................ 345/7; 345/2; 353/14; 359/630
[58] Field of Search ............ 340/705, 461, 980; 359/839–844, 859, 630–633; 353/13, 14; 345/1, 2, 7, 8, 9

[56] References Cited

U.S. PATENT DOCUMENTS

| 4,042,957 | 8/1977 | Ellis | 359/630 |
| 4,099,841 | 7/1978 | Ellis | 340/705 |
| 4,636,782 | 1/1987 | Nakamura et al. | 340/705 |
| 4,697,879 | 10/1987 | Gerbe | 340/705 |
| 4,711,544 | 12/1987 | Iino et al. | 353/14 |
| 4,818,048 | 4/1989 | Moss | 340/705 |
| 5,278,532 | 1/1994 | Hegg et al. | 345/2 |

Primary Examiner—Alvin E. Oberley
Assistant Examiner—Steven J. Saras
Attorney, Agent, or Firm—Armstrong, Westerman, Hattori, McLeland & Naughton

[57] ABSTRACT

There is disclosed an indication display unit for a vehicle which comprises a plurality of indicators including those for remote display as well, and a reflecting plate formed with a plurality of reflective surfaces and mounted on a dashboard. By use of the indication display unit described above, respective images indicated on the plurality of indicators are reflected on the plurality of reflective surfaces as to be visibly observed forwardly of the reflecting plate by a driver without interference with the driver's visual field.

4 Claims, 6 Drawing Sheets

INDICATION DISPLAY UNIT FOR A VEHICLE

This application is a continuation of application Ser. No. 07/799,028, filed Nov. 25, 1991, now abandoned, which is a continuation of application Ser. No. 07/330,010, filed Mar. 29, 1989, now abandoned.

BACKGROUND OF THE INVENTION

1. Field of the invention

The present invention relates to an indication display unit for a vehicle, which employs so-called a head-up display, the arrangement being such that an image indicated on an indicator is reflected by a reflecting member disposed in front of a windshield, whereby its virtual image is visibly observed being overlapped with an outside scenery viewed through the windshield thereof.

2. Description of the Prior Art

It has heretofore been proposed to adopt the head-up display, taking account of ensuring more space in compliance with the requirement for diversification of the indicators, and of better visual observation of indicated images during the driving.

Turning first to FIG. 12, there is illustrated an example of a conventional indication display unit for a vehicle adopting the above-mentioned head-up display.

In FIG. 12, a projector generally designated at 11 is secured to a ceiling 10 in the car room for indicating various vehicle driving operational information such as a vehicle speed and so on. The reference numeral 12 represents a semi-translucent mirror provided upwardly from a dashboard 30 disposed in front of a windshield 20. An image 13 indicated on the projector 11 is projected to the semi-translucent mirror 12 to be reflected thereon in such a way that the image 13 can be visibly observed from the driver seat as a virtual image overlapped with an outside scenery viewed through the windshield 20.

With this arrangement, the driver is allowed to visibly recognize the vehicle operational information such as engine-speed, residual fuel quantity and so on without averting his visual field to a great extent during the traveling.

If the head-up display is adapted to display warnings such as a half-closed door, shortage in oil and so forth, the driver can immediately recognize occurrence of abnormal conditions during the traveling.

There are, however, some problems inherent in the prior art display unit. More particularly, the indicated image is reflected by a single piece of reflecting surface as observed in the case of the semi-translucent mirror 12, and hence in order to obtain a large amount of indications to be observed, a good deal of information has to be indicated on the same projector, and thus a large-sized projector is required, resulting in a problem in terms of space for installation.

SUMMARY OF THE INVENTION

It is a primary object of the present invention to eliminate the above-described problems by providing an indication display unit for a vehicle, which comprises a plurality of indicators, and a reflecting plate formed with a plurality of reflective surfaces, characterized in that respective images indicated on the plurality of indicators are reflected toward the driver seat by the reflective surfaces formed beforehand on the reflecting plate.

Based on this arrangement, a variety of images displayed on the plurality of indicators provided in the car room can be visibly observed within a scope defined by the single piece of reflecting plate provided on the upper surface of a dashboard.

According to another aspect of the invention, there is provided an indication display unit for a vehicle, which comprises a plurality of indicators suitable for remote display, and a reflecting plate formed with a plurality of reflective surfaces, characterized in that respective images indicated on the plurality of indicators are reflected toward the driver seat by the reflective surfaces formed beforehand on the reflecting plate.

The images indicated on the plurality of indicators for the remote display can be visibly observed within the scope defined also by the single piece of reflecting plate provided on the upper surface of the dashboard. With this arrangement above, the indicated images are reflected toward the driver seat by the plurality of reflective surfaces, and thus the image projecting directions from individual indicators can be settled corresponding to desired displaying positions according to the inclination angle of each of the plurality of reflective surfaces.

BRIEF DESCRIPTION OF THE DRAWINGS

Other objects and advantages of the invention will become apparent during the following explanations in conjunction with the accompanying drawings in which.

DETAILED DESCRIPTION OF THE PREFERRED EMBODIMENTS

Figure 1:
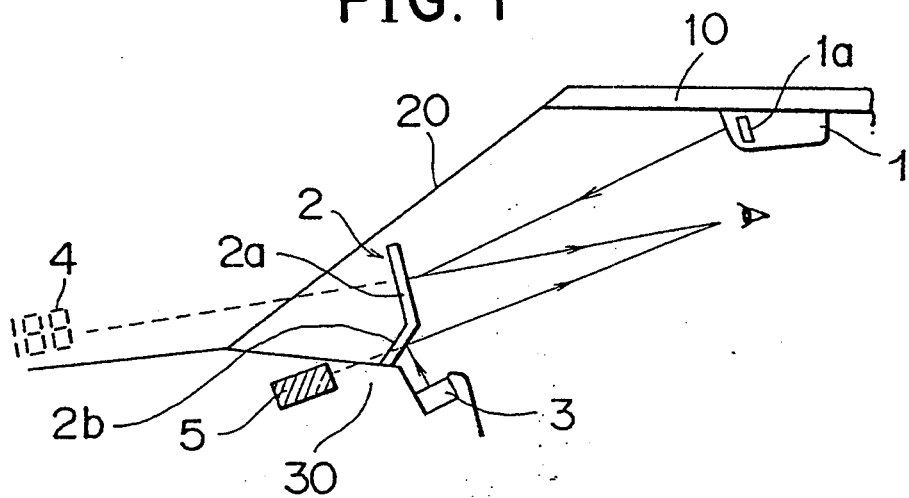
FIG. 1 is a view illustrating a first embodiment of the present invention.

Referring to FIG. 1, there is shown a first embodiment of the present invention. In FIG. 1, the reference numeral 1 denotes a projector, secured to a ceiling 10 provided above the driver seat in the car room, for indicating the vehicle speed in cooperation with an indicator 1a incorporated therein. A reflecting plate generally indicated at 2 is disposed on a dashboard 30 in front of a windshield 20. The numeral 3 represents another indicator, positioned downwardly of the reflecting plate 2 of the dashboard 30, for indicating various warnings.

Figure 2:
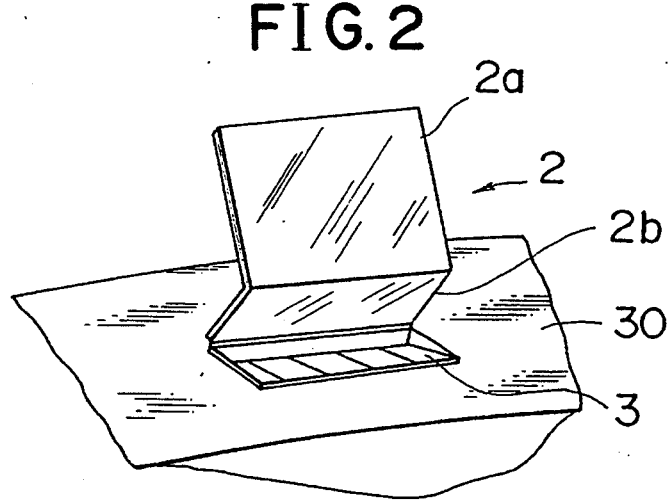
FIG. 2 is a view illustrating peripheral portions of a reflecting plate in the first embodiment.

FIG. 2 is a view illustrating peripheral portions of the reflecting plate 2. The reflecting plate 2 bent in a substantially L-like configuration is formed with a first reflective surface 2a upwardly inclined at its upper portion and a second reflective surface 2b downwardly inclined at its lower portion.

The surface of the indicator 3 provided on the dashboard 30 is sectioned into a plurality of indication windows adapted to indicate a variety of warnings.

Figure 3:
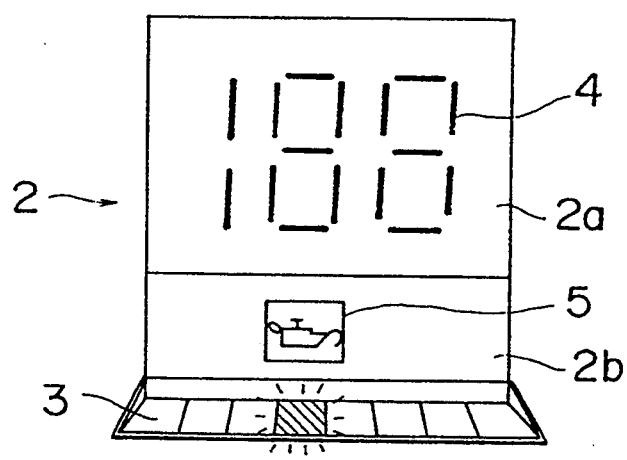
FIG. 3 is an illustration showing an example of the indicated images in the first embodiment.

The reflecting plate 2 is mounted at a predetermined inclination angle so that an image indicated on the projector 1 secured to the ceiling is reflected by the first reflective surface 2a, while an image indicatedin the indicator 3 on the dashboard 30 is reflected by the second reflective surface 2b, so that these images can be altegether observed from the driver seat. Therefore, as depicted in FIGS. 1 and 3, an image 4 indicating a vehicle speed on the projector 1 is reflected by the first reflective surface 2a and can be visibly observed forwardly of the windshield 20 from the driver seat. On the other hand, an image 5 of a warning indicated on the indicator 3 is reflected by the second reflecting surface 25 and can be visibly observed also forwardly of the reflecting plate 2.

As explained above, the vehicle speed is reflected on the upper portion of the reflecting plate 2, while the warning is indicated on the lower portion thereof. During the traveling, the warning indication as well as the vehicle speed indication can be provided within a visual field of the driver or in the vicinity thereof, as a result of which the effect as a head-up display is enhanced. The indicators are disposed on two positions; in the projector 1 attached to a car ceiling 10, and on the dashboard 30, whereby these indicators can be readily mounted causing no problem in terms of space for installation.

Figure 4A:
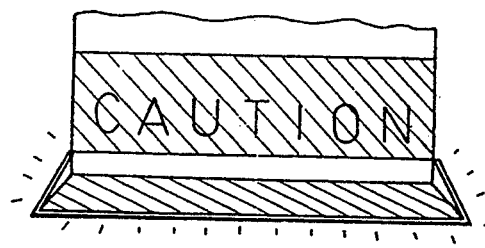
FIGS. 4A and 4B are illustrations showing other examples of the indicated images shown on a second reflecting surface in the first embodiment.
Figure 4B:
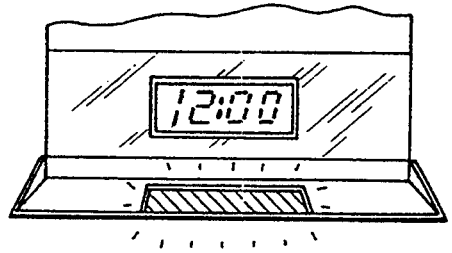
Figure 5:
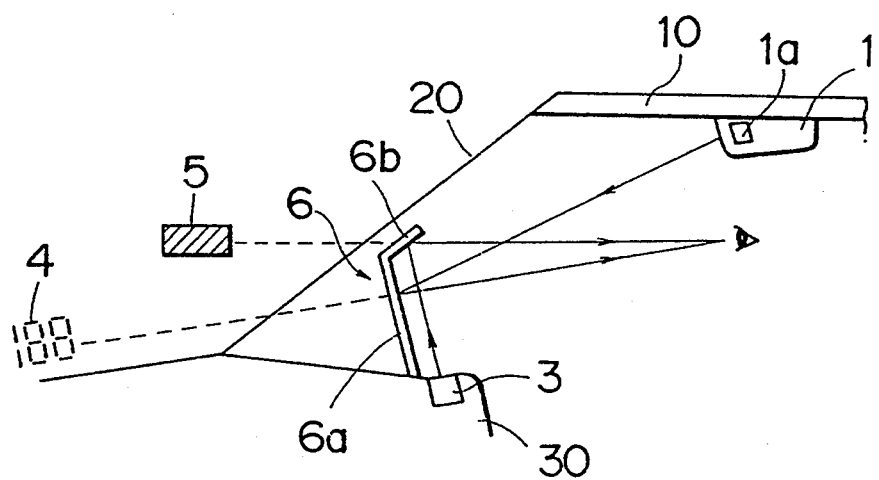
FIG. 5 is a view illustrating a second embodiment of the present invention.

Note that the .arrangement of the indicator 3 provided on the dashboard 30 is not limited to various sorts of warning indications described above but may indicate a general warning indication (CAUTION) as shown in FIG. 4A which is to be given when even one warning condition is generated; or alternatively time indications may, as depicted in FIG. 4B, be provided. FIG. 5 is a view of a second embodiment of the present invention, illustrating a variant example in which the positions of the first and second reflective surfaces respectively 2a and 2b of the reflecting plate 2 in the first embodiment are varied. The same components of FIG. 5 as those shown in FIG. 1 are marked with the similar symbols.

Figure 6:
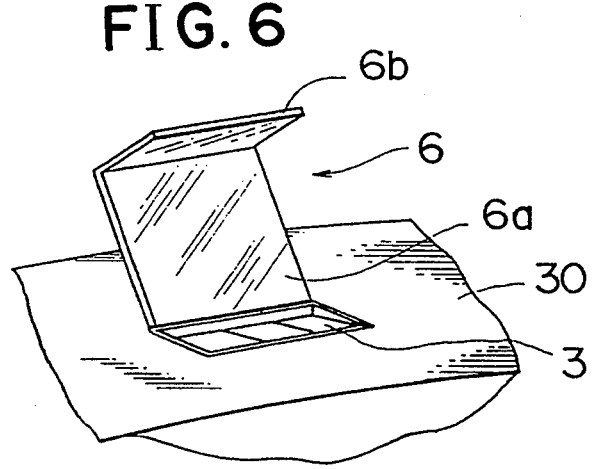
FIG. 6 is an illustration depicting a reflecting plate and indicators provided on a dashboard in the second embodiment.

A reflecting plate 6, as depicted in FIG. 6, includes; a first reflective surface 6a, formed at its lower portion, on which the indicated image on the projector 1 is reflected; and a second reflective surface 6b, provided upwardly of the first reflective surface 6a, on which the image indicated on the indicator 3 formed on the dashboard 30 is reflected. Based on this arrangement, as shown in FIG. 5, an indicated image on the projector 1 is reflected by the first reflective surface 6a, and the virtual image 4 thereof indicating the vehicle speed is visibly observed forwardly of the windshield 20; while an indicated image on the indicator 3 is reflected by the second reflective surface 6b, and the virtual image 5 thereof indicating a warning condition is visibly observed above the vehicle speed indication through the windshield 20. In accordance with this embodiment, the vehicle speed and the image indicated on the indicator 3 as well can be visibly observed being overlapped with an outside scenery viewed through the windshield, resulting in that the displaying effect is further enhanced.

Figure 7:
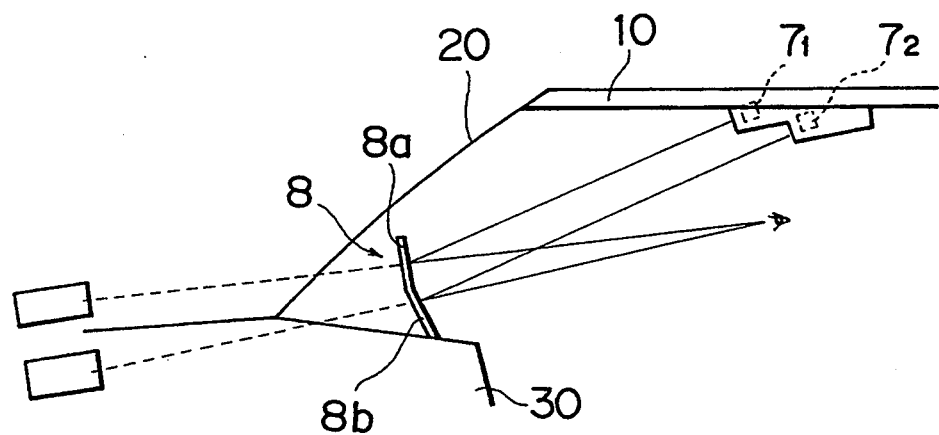
FIG. 7 is a view illustrating a third embodiment of the present invention.

Turning attention to FIG. 7, there is illustrated a third embodiment of the present invention. In the third embodiment, the indicated image is enlarged or arranged to be visually recognizable from the remotest possible position. This arrangement therefore involves the use of a first and a second projectors $7_1$ and $7_2$ each mounted with a lens suitable for the remote display forwardly of the indicator. Note that the same components as those shown in FIGS. 1 and 5 are marked with the similar symbols. As shown in FIG. 7, the first and second projectors $7_1$ and $7_2$ are encased in an integrally shaped casing. The second projector $7_2$ positioned lower than the first one has its indicating surface recessed from the other indicating surface of the first projector $7_1$ to the rear direction of the vehicle, thereby providing a clearance above the driver's head. Hence, no troublesome feeling is given to the driver.

Figure 8:
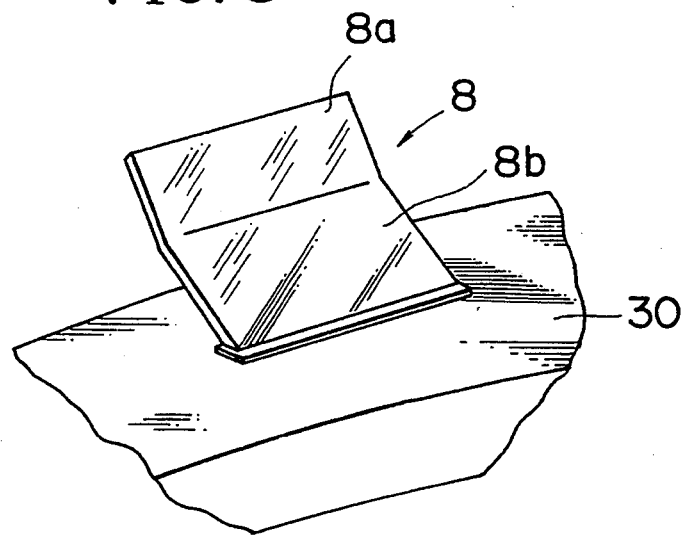
FIG. 8 is an illustration depicting the peripheral portions of the reflecting plate in the third embodiment.
Figure 9:
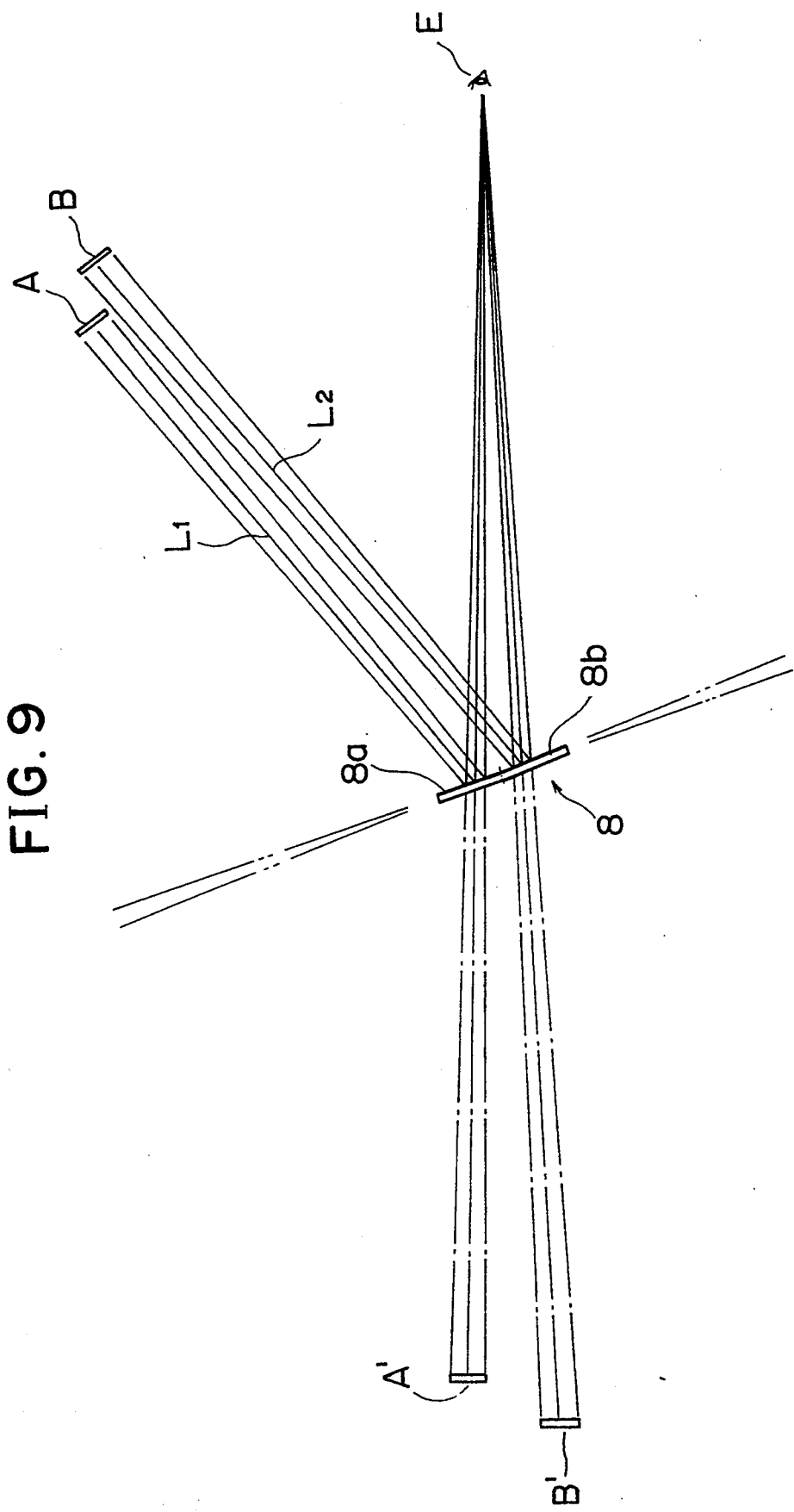
FIG. 9 is conceptual diagram showing mutual relations of optical positions in the third embodiment.

As depicted in FIG. 8, a reflecting plate 8 has; a first reflective surface 8a, disposed upwardly of a second reflective surface 8b, for reflecting an image indicated on the first projector $7_1$; and a second reflective surface 8b, disposed below the first reflective surface 8a, for reflecting an image indicated on the second projector $7_2$. Accordingly a substantially L shape is formed on the dashboard 30 with the recessed portion thereof facing to the driver seat. FIG. 9 is a conceptual diagram showing mutual relations of optical positions among indicated images A and B on the first and second projectors $7_1$ and $7_2$, reflecting plate 8 and a driver visual position E. Referring to FIG. 9, rectilinear lines $L_1$ and $L_2$ indicate optical axes of the remote display lenses respectively of the first and second projectors $7_1$ and $7_1$, and visual position E is on the optical lines of extension of the optical axes $L_1$ and $L_2$.

Figure 11:
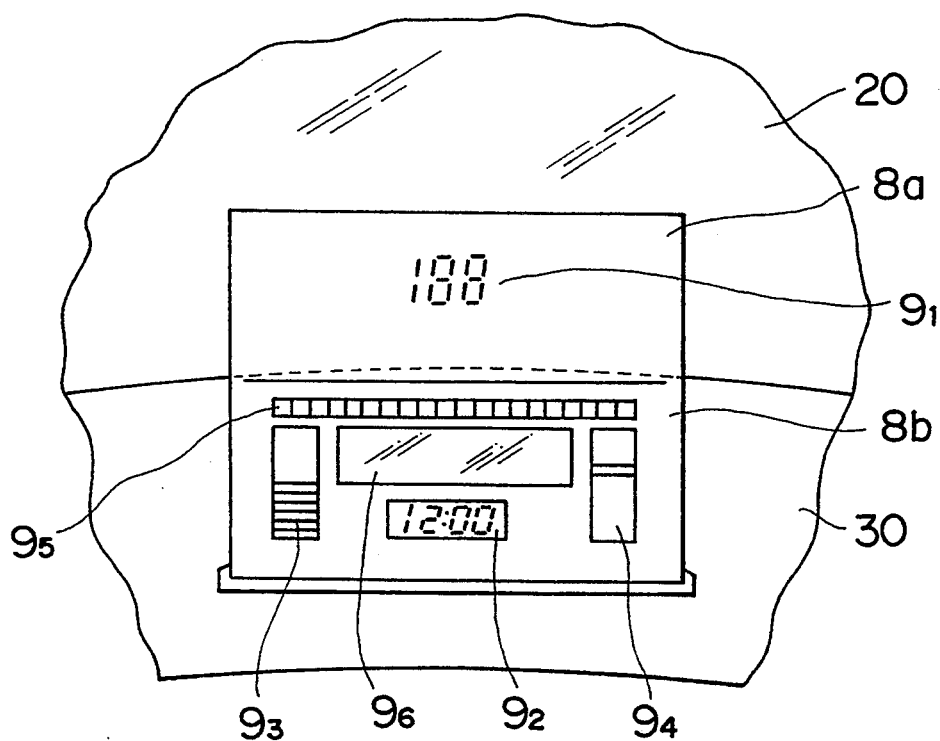
FIG. 11 is a view illustrating an example of the indicated images in the third embodiment.
Figure 12:
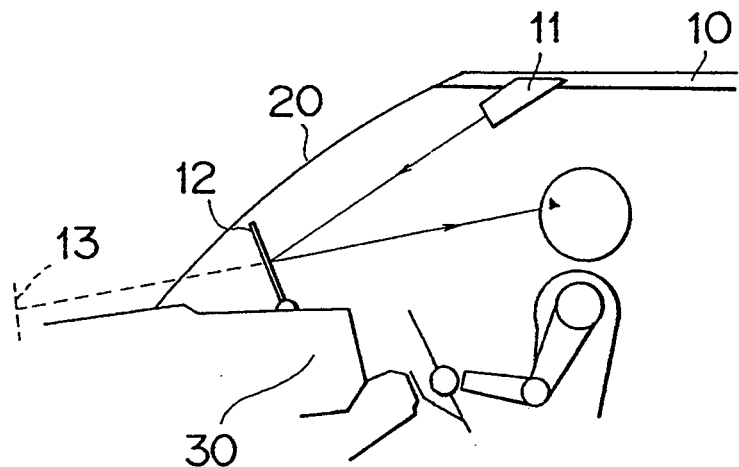
FIG. 12 is a view illustrating one example of a prior art indication display unit for a vehicle in use of a head-up display.

Images A and B indicated on the first and second projectors $7_1$ and $7_2$ are reflected by the first and second reflective surfaces 8a and 8b, respectively. The virtual images A' and B' are visibly observed forwardly of the vehicle when viewed from the visual position E. FIG. 11 shows an example of the indicated images in the foregoing illustrative embodiment, wherein a speed indication $9_1$ is indicated on the first reflective surface 8a by use of the first projector $7_1$, while the second reflective surface 8b reflects various driving operational information items $9_2 \sim 9_6$ by use of the second projector $7_2$. Incidentally, in FIG. 11 the symbol $9_2$ represents a timer indication, $9_3$ denotes a residual fuel quantity, $9_4$ stands for a temperature indication, $9_5$ designates a rotational frequency indication and $9_6$ represents an indication of each of various kinds of warnings. As described in FIG. 11, the first reflective surface 8a is positioned within a visual field defined by the windshield 20 when viewed from the driver seat (visual position E), whereas the second reflective surface 8b is positioned with the dashboard 30 serving as a background thereof, outside the range observable through the windshield.

Hence, the speed indication $9_1$ is indicated within the visual field observable through the windshield 20, thus obtaining a satisfactory function as a head-up display. Various driving information items $9_2 \sim 9_6$, each of which are indicated on the second reflective surface, are indicated outside the visual field observable through the windshield 20, but in the vicinity thereof. For this reason, the function associated with the head-up display can be attained to some extent in a state where no interference with the driver's visual field is caused.

By the way, for setting the plurality of indicated images in the predetermined displaying positions on the reflecting plate, as stated before, it is required that the relations of optical positions be taken into consideration. Particularly, as in this embodiment, the projectors are in some cases regulated with the scope which permits the visual confirmation of the indicated images. More specifically, a virtual image enlarged by the lens is formed in a more inside position than the indicating surface thereof. Hence, the indicating image visually recognizable through the reflecting plate can be seen in a still farther position forwardly of the vehicle. The visual confirmation of the image, however, entails a step of making the visual line coincident with the optical axis of the lens.

Figure 10:
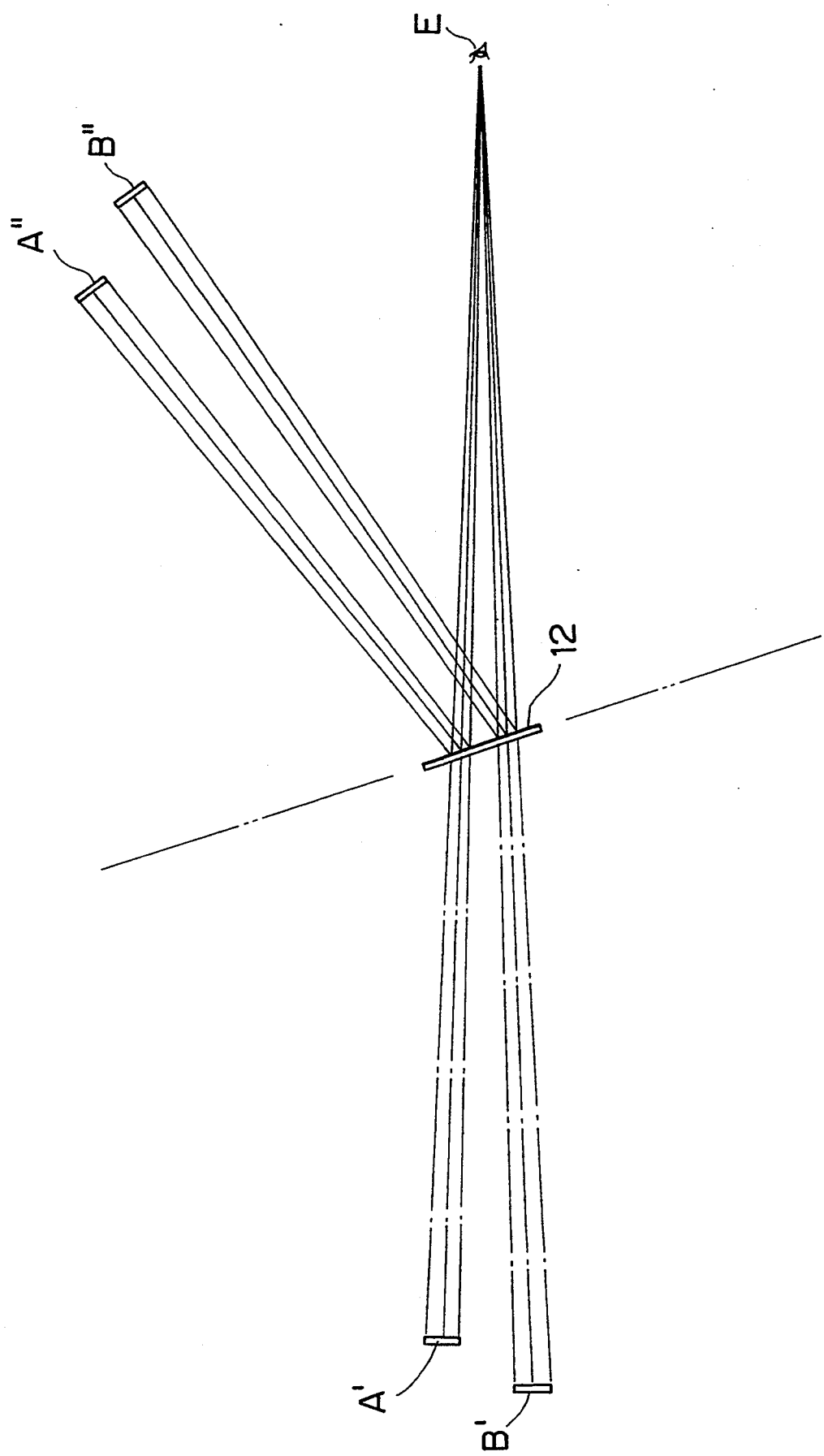
FIG. 10 is an auxiliary diagram explaining problems which will arise when using a single piece of reflective surface in connection with the third embodiment.

Therefore, as depicted in FIG. 10, when employing a reflecting plate 12 formed with only a single reflective surface as in the prior art device, it is necessary to separate the indicated images on the projectors to some extent like the relation between A'' and B'' shown in FIG. 10 to obtain the virtual images A' and B' in the same positions as those in the above-described embodiment (FIG. 9). This arrangement leads to an increase in size of the projector as a whole.

In accordance with the illustrative embodiment described above in which the first and second reflective surfaces 8a and 8b are combined to constitute the reflecting plate 8, however, as is observed from FIGS. 9 and 10, the images A and B indicated on the projector $7_1$ and $7_2$ can be made closer to each other, and the projectors as a whole can also be reduced in size.

As discussed above, the indication display unit according to the present invention includes a plurality of indicators on which respective images thereof are indicated. The indicated images are individually reflected toward the driver seat by way of a plurality of reflective surfaces, so that the indicators as well as projectors do not need to increase the size of the configuration thereof. Besides, a good number of indicated images can be visibly observed within a single reflecting plate provided on the upper surface of the dashboard.

On the occasion of using the plurality of indicators adaptive to the remote display, the displaying positions are set according to the inclination angles of the plurality of reflective surfaces, and hence a large number of indicated images can visually be recognized by disposing the plurality of indicators in a confined space.

Although the illustrative embodiments of the present invention have been described in greater detail with reference to the accompanying drawings, it is to be understood that the invention is not limited to those precise embodiments. Various changes or modification may be effected therein by one skilled in the art without departing from the spirit or scope of the invention.

What is claimed is:

1. An indication display unit for a vehicle, comprising:
   a plurality of indicators; and
   a reflecting plate formed with a plurality of reflective surfaces, said reflective surfaces being vertically arranged at a predetermined angle with respect to each other and having adjoining ends thereof connected to each other, and said reflecting plate being mounted on a dashboard between a windshield of said vehicle and a driver, each of the reflective surfaces being planar,
   wherein respective images indicated on a respective one of said plurality of indicators are separately reflected on a corresponding one of said plurality of reflective surfaces so that each image can be separately and directly observed forwardly of said reflecting plate by a driver at an angle of reflection different from another angle of reflection of another image, wherein said plurality of indicators comprise one of:
   (a) at least one indicator which is located at a ceiling of said vehicle and has an image directed to a front of said vehicle and into a first reflective surface of said reflecting plate, and at least one indicator which is located at said dashboard of said vehicle and has another image directed substantially upwards and into a second reflective surface of said reflecting plate, and
   (b) at least one indicator which is located at a ceiling of said vehicle and has said image directed to said front of said vehicle and into at least one of first and second reflective surfaces of said reflecting plate to thereby allow said driver to observe said image and said another image forwardly of said reflecting plate.

2. An indication display unit for a vehicle as claimed in claim 1, wherein said reflecting plate is bent in a substantially L shape configuring upper and lower reflective surfaces thereon; one of which being inclined upwardly, while the other being inclined downwardly.

3. An indication display unit for a vehicle, comprising:
   a plurality of indicators for remote display; and
   a reflecting plate formed with a plurality of reflective surfaces, said reflective surfaces being vertically arranged at a predetermined angle with respect to each other and having adjoining ends thereof connected to each other, and said reflecting plate being mounted on a dashboard between a windshield of said vehicle and a driver, each of reflective surfaces being planar,
   wherein respective images indicated on a respective one of said plurality of indicators are separately reflected on a corresponding one of said plurality of reflective surfaces so that each image can be separately and directly observed forwardly of said reflecting plate by a driver at an angle of reflection different from another angle of reflection of another image, wherein said plurality of indicators comprise one of:
   (a) at least one indicator which is located at a ceiling of said vehicle and has an image directed to a front of said vehicle and into a first reflective surface of said reflecting plate, and at least one indicator which is located at said dashboard of said vehicle and has another image directed substantially upwards and into a second reflective surface of said reflecting plate, and
   (b) at least one indicator which is located at a ceiling of said vehicle and has said image directed to said front of said vehicle and into at least one of first and second reflective surfaces of said reflecting plate to thereby allow said driver to observe said image and said another image forwardly of said reflecting plate.

4. An indication display unit for a vehicle as claimed in claim 3, wherein positions of said plurality of indicators for remote display can be determined according to inclination angles of each of said plurality of reflecting surfaces.

* * * * *